US009548766B2

(12) United States Patent
Norman et al.

(10) Patent No.: US 9,548,766 B2
(45) Date of Patent: Jan. 17, 2017

(54) SYSTEMS AND METHODS FOR TESTING SUSCEPTIBILITY OF AIRCRAFT COMPONENTS TO RADIO FREQUENCIES

(71) Applicant: Textron Innovations, Inc., Providence, RI (US)

(72) Inventors: Joseph Charles Norman, Wichita, KS (US); Adam Blake Wolfe, Wichita, KS (US); Mark Christopher Hansen, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 267 days.

(21) Appl. No.: 14/244,618

(22) Filed: Apr. 3, 2014

(65) Prior Publication Data

US 2015/0288466 A1 Oct. 8, 2015

(51) Int. Cl.
*H04B 1/00* (2006.01)
*H04B 1/403* (2015.01)

(52) U.S. Cl.
CPC ............ *H04B 1/0057* (2013.01); *H04B 1/406* (2013.01)

(58) Field of Classification Search
CPC . H04W 84/005; H04W 24/00; H04W 17/0085
See application file for complete search history.

(56) References Cited

U.S. PATENT DOCUMENTS

| 4,742,336 | A  | * | 5/1988 | Hall ........................ | G08B 25/10 340/531 |
|---|---|---|---|---|---|
| 7,302,234 | B1 | * | 11/2007 | Fessler ................. | H04B 17/345 455/423 |
| 8,181,206 | B2 |   | 5/2012 | Hasek |  |
| 8,219,157 | B2 | * | 7/2012 | Lum ....................... | H01Q 21/28 455/553.1 |
| 8,400,911 | B2 |   | 3/2013 | Smith et al. |  |
| 8,417,286 | B2 | * | 4/2013 | Gorbachov .......... | H04B 1/0064 455/552.1 |
| 9,037,190 | B2 | * | 5/2015 | Desclos ................... | H04B 7/15 455/550.1 |
| 2002/0181405 | A1 | * | 12/2002 | Ying ....................... | G05B 15/02 370/245 |
| 2003/0009761 | A1 | * | 1/2003 | Miller .................... | H04L 29/06 725/76 |
| 2008/0279093 | A1 |   | 11/2008 | Hassan et al. |  |
| 2009/0116466 | A1 |   | 5/2009 | Lee et al. |  |
| 2009/0228240 | A1 | * | 9/2009 | Makela ................. | G01R 31/002 702/185 |
| 2010/0014571 | A1 | * | 1/2010 | Horton ................ | H04B 7/18506 375/227 |
| 2010/0248799 | A1 | * | 9/2010 | Lum ....................... | H01Q 21/28 455/575.7 |
| 2010/0256864 | A1 | * | 10/2010 | Ying ................... | H04L 12/2697 701/31.4 |

(Continued)

*Primary Examiner* — Lewis West
(74) *Attorney, Agent, or Firm* — Erise IP, P.A.

(57) ABSTRACT

An apparatus for testing for the susceptibility of an aircraft system to radio frequencies comprises a wireless module for generating radio signals that sweep each of the 2.4 GHz frequency band and the 5 GHz frequency band. A first amplifier is configured for amplifying signals in the 2.4 GHz band, and a second amplifier is configured for amplifying signals in the 5 GHz band. The apparatus comprises at least one dual band antenna for transmitting the signals in each of the 2.4 GHz and the 5 GHz bands.

15 Claims, 4 Drawing Sheets

(56) References Cited

U.S. PATENT DOCUMENTS

| | | | | |
|---|---|---|---|---|
| 2011/0117869 A1* | 5/2011 | Woodings | .............. | G01R 23/16 |
| | | | | 455/226.4 |
| 2011/0249622 A1 | 10/2011 | Takeda et al. | | |
| 2011/0256835 A1* | 10/2011 | Schirrmacher | ...... | H04B 5/0018 |
| | | | | 455/67.11 |
| 2012/0135782 A1* | 5/2012 | Wang | ....................... | H01Q 5/35 |
| | | | | 455/553.1 |
| 2012/0207032 A1* | 8/2012 | Chen | ......................... | H04L 1/24 |
| | | | | 370/252 |
| 2013/0094369 A1 | 4/2013 | Nielsen et al. | | |
| 2013/0096906 A1 | 4/2013 | Niemeyer et al. | | |
| 2014/0187173 A1* | 7/2014 | Partee | ................... | H04B 17/00 |
| | | | | 455/67.12 |

\* cited by examiner

SYSTEMS AND METHODS FOR TESTING SUSCEPTIBILITY OF AIRCRAFT COMPONENTS TO RADIO FREQUENCIES

CROSS-REFERENCE TO RELATED APPLICATIONS

None.

FIELD OF THE INVENTION

The invention relates generally to the field of test equipment for aircraft. More specifically, the invention relates to the field of testing for the susceptibility of aircraft components to radio frequencies.

SUMMARY

Systems and methods for allowing a user to test the susceptibility of aircraft components to radio frequencies are disclosed herein. According to one embodiment, an apparatus for testing for the susceptibility of an aircraft system to radio frequencies comprises a wireless module for generating each of a first radio signal and a second radio signal. The first radio signal is in a first frequency band and the second radio signal is in a second frequency band. The apparatus further comprises a first amplifier configured for amplifying signals in the first frequency band and a second amplifier configured for amplifying signals in the second frequency band. A diplexer is operably coupled to the wireless module and routes the first radio signal to the first amplifier and the second radio signal to the second amplifier. The apparatus also includes at least one dual band antenna for transmitting each of the first radio signal and the second radio signal within the aircraft. Each of the wireless module, the diplexer, the first amplifier and the second amplifier are housed in a portable arrangement.

According to another embodiment, a method for testing for the susceptibility of an aircraft system to radio frequencies comprises the step of using software instructions to cause a wireless module to generate a first signal and a second signal. The first signal is in a first frequency band and the second signal is in a second frequency band. The method further comprises the steps of using a first amplifier to amplify the first radio signal and a second amplifier to amplify the second radio signal. The method also includes the step of using at least one dual band antenna to transmit each of the first signal and the second signal within the aircraft. Each of the wireless module, the first amplifier, and the second amplifier are housed in a portable arrangement.

According to yet another embodiment, an apparatus for testing for the susceptibility of an aircraft system to radio frequencies comprises a wireless module for generating radio signals that sweep each of the 2.4 GHz frequency band and the 5 GHz frequency band. A first amplifier is configured for amplifying signals in the 2.4 GHz band, and a second amplifier is configured for amplifying signals in the 5 GHz band. The apparatus comprises at least one dual band antenna for transmitting the signals in each of the 2.4 GHz and the 5 GHz bands.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for testing for the susceptibility of aircraft components to radio frequencies. It has been known since at least the early 1960s that personal electronic devices carried onboard an aircraft by passengers and crew members could interfere with and disrupt the workings of the various aircraft systems, such as the aircraft's communication, navigation, and autopilot systems. To this effect, the Radio Technical Commission for Aeronautics published in 1963 a report entitled RTCA/DO-119 that suggested that the operation of portable radio and television receivers be prohibited during flight. This recommendation was codified, and set the stage for subsequent legislation that restricted the operation during flight of other transmitting personal electronic devices.

Back in the 1960's, passengers and crew members were perfectly happy to leave their transmitting personal electronic devices at home, or to power them off and stow them away with their luggage. In today's information age, however, transmitting personal electronic devices such as cell phones, laptops, tablets, et cetera, have become so ubiquitous and integral to the public's need to remain connected to the Internet, that causing every passenger and crew member to turn off all their transmitting personal electronic devices during flight has become undesirable. Indeed, to cater to the needs of the public, more and more aircraft carriers now offer in-flight wireless Internet so that the passengers may remain connected to the World Wide Web during flight. This trend is not likely to decline, and it is expected that in-flight wireless internet service will soon become a standard service. It is thus more important than ever that aircraft systems be tested for their susceptibility to radio frequencies, particularly at frequency ranges utilized by transmitting personal electronic devices, so as to ensure that the workings of these aircraft systems are not undesirably affected by the operation of the transmitting personal electronic devices.

Heretofore, generally, the susceptibility of aircraft systems to radio frequencies has been tested using an anechoic chamber or a reverberation chamber. These methods are both costly and time consuming. Specifically, each aircraft system must first be removed from the aircraft and placed in the anechoic or reverberation chamber so that it can be individually tested and qualified to meet the requirements set forth by the Radio Technical Commission for Aeronautics and the accompanying legislation. The present invention provides a cheaper and more efficient alternative to test for the susceptibility of aircraft systems to radio frequencies.

Figure 1:
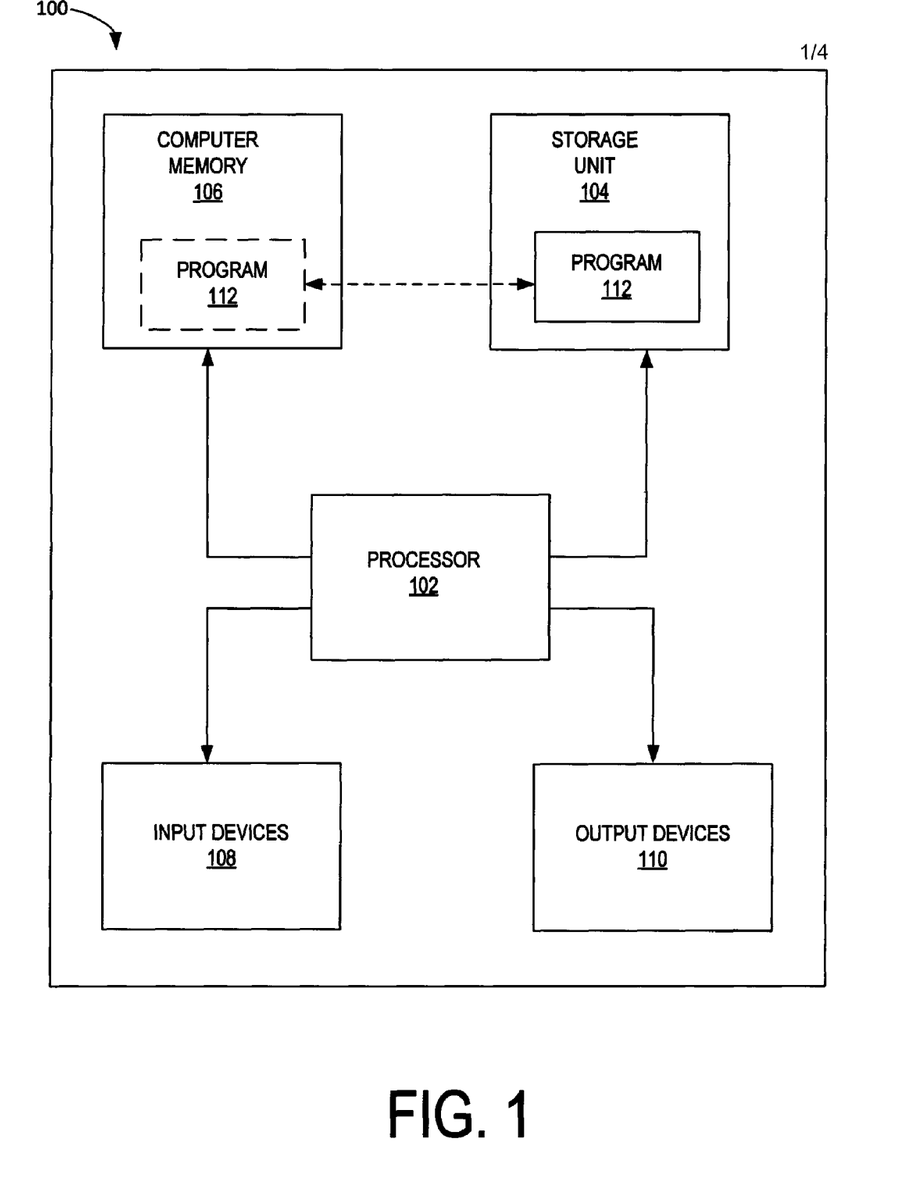
FIG. 1 is a schematic showing the various components of a system for testing for the susceptibility of aircraft components to radio frequencies, according to an embodiment.

Attention is directed now to FIG. 1 which shows a system (or apparatus) 100 for testing the susceptibility of aircraft systems to radio frequencies, particularly the radio frequencies utilized by the chief IEEE 802.11 protocols. Specifically, the system 100 allows for the testing of the susceptibility of aircraft systems to radio frequencies utilized by the 802.11a, 802.11b, 802.11g, and 802.11n protocols. The "11" standards in the "802" family of standards governs wireless local area networking as set forth by the IEEE LAN/MAN Standards Committee. People of skill in the art will appreciate that the 802.11b and 802.11g protocols operate at a frequency band of 2.4 GHz, the 802.11a protocol operates at a frequency band of 5 GHz, and that the 802.11n protocol utilizes both the 2.4 GHz and the 5 GHz bands. People of skill in the art will further appreciate that each of these frequency bands may be divided into overlapping and/or non-overlapping frequency channels having unique center frequencies. For example, the 802.11b protocol, which operates in the 2.4 GHz band, may comprise fourteen channels as set forth below in Table 1.

TABLE 1

Frequency channels used in the 2.4 GHz band

| Channel | Center Frequency (GHz) |
|---|---|
| 1 | 2.412 |
| 2 | 2.417 |
| 3 | 2.422 |
| 4 | 2.427 |
| 5 | 2.432 |
| 6 | 2.437 |
| 7 | 2.442 |
| 8 | 2.447 |
| 9 | 2.452 |
| 10 | 2.457 |
| 11 | 2.462 |
| 12 | 2.467 |
| 13 | 2.472 |
| 14 | 2.484 |

Different countries may regulate and disallow the use of some of these channels. For example, the use of channel 14 is forbidden in the United States, and channels 12 and 13 may only be used here under lower powered conditions. Japan, on the other hand, does not impose these restrictions on the use of channels 12 and 13.

Returning to FIG. 1, the system 100 may comprise a processor 102, which may be in data communication with a storage unit 104, a computer memory 106, input devices 108 and output devices 110. The storage unit 104 may be, for example, a disk drive that stores programs and data, and the storage unit 104 is illustratively shown storing a program 112 embodying the steps and methods set forth below. It should be understood that the program 112 could be broken into subprograms and stored in storage units of separate computers and that data could be transferred between those storage units using methods known in the art. A dashed outline within the computer memory 106 represents the software program 112 loaded into the computer memory 106 and a dashed line between the storage unit 104 and the computer memory 106 illustrates the transfer of the program 112 between the storage unit 104 and the computer memory 106. As discussed in more detail below, in some embodiments, it may be desirable for the system 100 to be portable. In these embodiments, a solitary memory module may incorporate the functionality of the storage unit 104 and the computer memory 106. Further, in some embodiments, the processor 102, the storage unit 104 and the computer memory 106 may reside on a single-board computer.

The input devices 108 may comprise switches, knobs, biometric sensors, and any other appropriate input devices (e.g., iris or voice recognition sensors, fingerprint scanners, et cetera) whether currently available or later invented. The output devices 110 may comprise computer monitors or other display devices, printers, speakers, signal generators, amplifiers, antennas, et cetera. In some embodiments, some of the functionality of the input devices 108 and the output devices 110 may be integrated into one device. For example, in some embodiments, the system 100 may include a touch-screen capable of receiving inputs from and providing outputs to a user.

Figure 2:
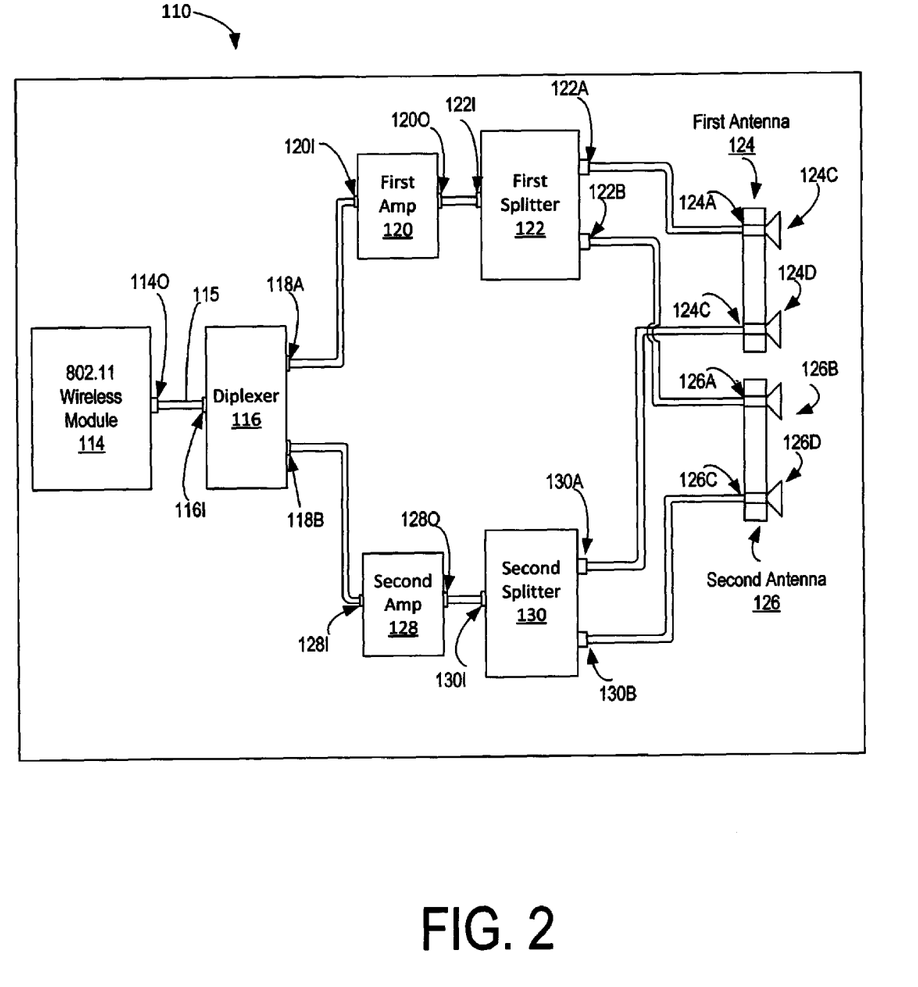
FIG. 2 is a schematic showing output devices of the system of FIG. 1 and communication between these output devices.

Attention is directed now to FIG. 2, which shows a configuration of certain of the output devices 110 according to an embodiment. The output devices 110 may comprise a standard, off-the-shelf wireless module 114 that is compatible with each of the 802.11a, 802.11b, 802.11g, and 802.11n protocols. Specifically, the 802.11 wireless module 114 may be capable of physically generating the desired radio frequencies at the 2.4 GHz and the 5 GHz bands, encompassing all the relevant underlying channels. As discussed in more detail herein, the program 112 may include functionality to cause the wireless module 114 to sweep through all the desired frequencies in the 2.4 GHz and 5 GHz bands in a short amount of time (e.g., fifteen minutes or less).

A cable 115, such as a coaxial cable, for example, may be connected at an output port 114O of the 802.11 wireless module 14, and may be used to provide the signals generated by wireless module 114 to a diplexer 116. Specifically, as can be seen in FIG. 2, the diplexer 116 may have an input port 116I for the inputting of the signals generated by the module 114 via the cable 115. The diplexer 116 may split the 2.4 GHz and the 5 GHz radio feeds generated by the module 114, and each of these feeds may be routed at the output ports 118A, 118B, of the diplexer 116, respectively. The diplexer 116 (and the other components of the system 100) may be a commercial, off-the-shelf product. For example, the L-Comm (accessible at www.l-com.com) item number DP245-NF may be used in the system 100 as the diplexer 116.

The feed at the 2.4 GHz band, which may be split by the diplexer 116 and outputted at its output port 118A, may then be fed as an input to a first amplifier 120 at its input port 120I. The first amplifier 120, which may be configured for amplification of radio signals in the 2.4 GHz band, may amplify the feed it receives from the diplexer 116 and output the amplified signals at its output port 120O. Akin to the diplexer 116, the first amplifier 120 may also be a commercially available, off-the-shelf product. For example, in some embodiments, L-Com item number HA2405GT-NF, which is a high power Radio Frequency amplifier compatible with the 802.11 b and g protocols, may be used as the amplifier 120. In some embodiments, specifically where this particular amplifier (i.e., the L-Com item number HA2405GT-NF) is utilized, it may be desirable to also provide a DC Power Injector (i.e., a Bias-T, e.g., L Com item number BT2405, not specifically shown) between the output port 118A of the diplexer 118 and the input port 120O of the amplifier 120.

The amplified signals as outputted at the output port 120O of the first amplifier 120 may then be fed to a first splitter 122 at its input port 122I. As will be appreciated, the first splitter 122 may have a first output port 122A and a second output port 122B that split the radio feed being inputted to the splitter 122 at its input 122I from the amplifier 120. The first splitter 122, as the other components of the system 100, may be a commercial, off-the shelf item. For example, in some embodiments, L-Com item number SC2402N, which is configured for the 2.4 GHz band, may be used as the first splitter 122.

The output from the first output port 122A of the first splitter 122 may be fed to a first dual-band, multiple input-multiple output, omnidirectional antenna 124. Specifically, the first antenna 124 may have a first input 124A and a first output 124B for respectively receiving and transmitting a feed at the 2.4 GHz band, and the signals outputted from the first output port 122A of the first splitter 122 may be provided as an input to the first input port 124A of the first antenna 124. The first output port 124B of the first antenna 124 may then cause the signals in the 2.4 GHz band to be transmitted in all directions. The first antenna 124 may also have a second input port 124C and a second output 124D for respectively receiving and transmitting a feed at the 5 GHz band, as discussed below.

The system 100 may also comprise a second dual-band, multiple input-multiple output, omnidirectional antenna 126, which may be generally identical to the first antenna 124. That is, the second antenna 126 may similarly have a first input port 126A and a first output port 126B for respectively receiving and transmitting a feed at the 2.4 GHz band, and a second input port 126C and a second output port 126D for respectively receiving and transmitting signals at the 5 GHz band. As discussed above, the signals outputted at the first output port 122A of the first splitter 122 may be provided as an input to the first input port 124A of the first antenna 124. The signals outputted at the second output port 122B of the first splitter 122, conversely, may be provided as an input to the first input port 126A of the second antenna 126. The first output port 126B of the second antenna 126 may cause the signals to be transmitted omni-directionally. While not required, each of the first and the second antennas 124, 126 may be identical and available commercially. For example, in some embodiments, L-com item number HG2458-3SDC-3NF may be used as the antennas 124, 126.

Returning now to the 5 GHz feed at the output port 118B of the diplexer 116, this feed may be fed to a second amplifier 128. Much like the first amplifier 120, the second amplifier 128 may have an input 128I and an output 120O; however, unlike the first amplifier 120, which was configured for amplification of radio signals in the 2.4 GHz band (i.e., the 802.11 b/g protocols), the second amplifier 128 may be configured for the amplification of radio signals in the 5 GHz band (i.e., the 802.11a protocol). The feed at the output port 118B of the diplexer 116 may be fed to the input 128I of the second amplifier 128I, which may output the amplified signals at its output port 128O. The second amplifier 128 may also be an off-the-shelf product. For example, in some embodiments, L-Com item number HA5805 may be used as the second amplifier 128.

The amplified signals as outputted at the output port 128O of the second amplifier 128 may then be fed to a second splitter 130 at its input port 130I. The second splitter 130, much like the first splitter 122, may have a first output port 130A and a second output port 130B that split the signals being received at the input port 130I; however, unlike the first splitter 122, which may be configured to operate primarily in the 2.4 GHz band, the second splitter 130 may be configured for splitting of signals at the 5 GHz band. The second splitter 130 may also be a commercial, off-the shelf item. For example, in some embodiments, L-Com item number SC5802 may be used as the second splitter 130.

The signals at the first output port 130A of the second splitter 130 may be fed as an input to the second input port 124C of the first antenna 124, and the second output port 124D of the first antenna 124 may cause these signals at the 5 GHz to be transmitted in all directions. Similarly, as can be appreciated from FIG. 2, the signals at the second output port 130B of the second splitter 130 may be fed as an input to the second input port 126C of the second antenna 126, and the second output port 126D of the second antenna 126 may cause the feed to be transmitted omni-directionally. Using two dual band antennas 124, 126 as opposed to two single band antennas may ensure that the radio feeds at both the frequency bands are transmitted throughout the aircraft at desirable strengths.

People of skill in the art will readily appreciate that while the system 100 may comprise off-the-shelf components as detailed herein, that this is in no way required, and also that other off-the-shelf components not specifically referenced herein may replace some or all of the components named herein. Further, the properties of the various components may be varied without departing from the scope of the invention. For example, while the wireless module 114 is disclosed as generating signals in the 2.4 GHz and the 5 GHz bands, a wireless module 114 that generates signals in additional bands (e.g., the 3.6 GHz band employed by the 802.11y protocol) may also be employed without departing from the scope of the invention.

Figure 3:
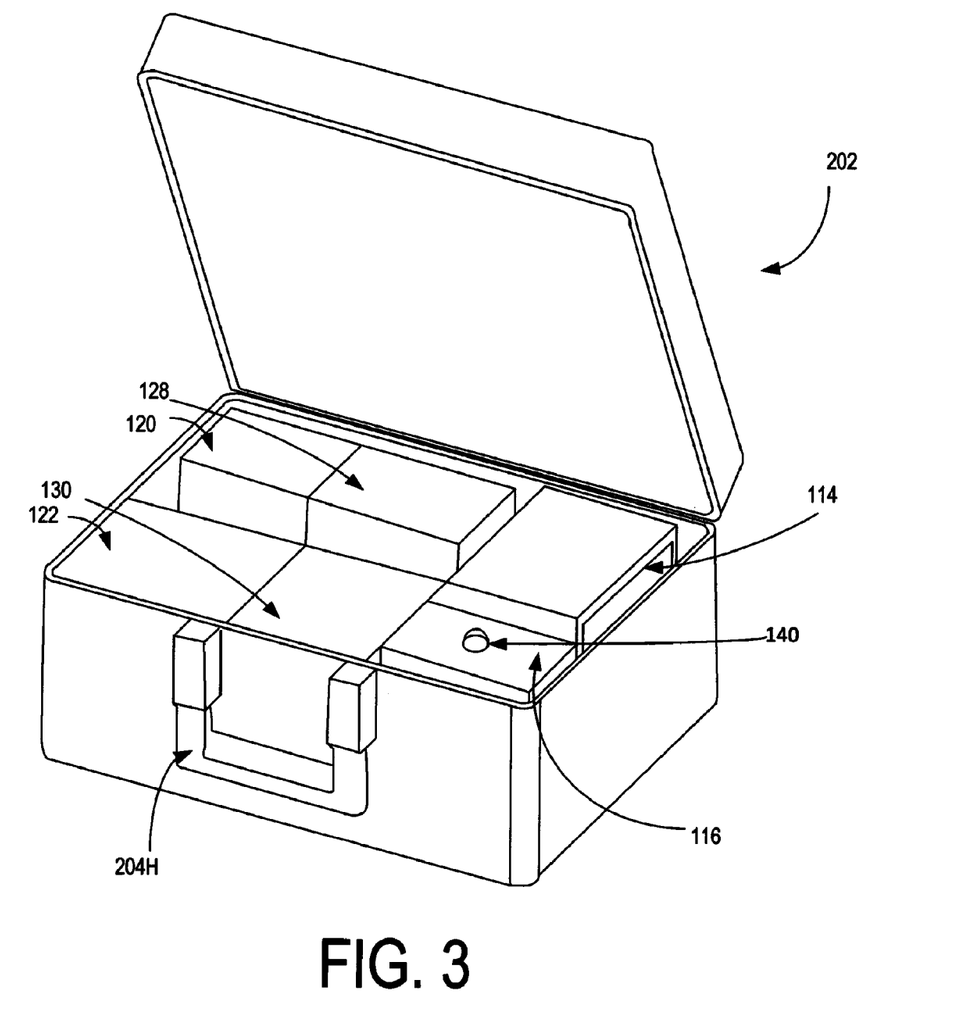
FIG. 3 is a perspective view of a portable enclosure for housing the system of FIG. 1.

While not required, the system 100 may be housed in a portable enclosure 202. For example, as shown in FIG. 3, the system 100 may be housed in a briefcase 202. The briefcase 202 may have a handle 204H that allows the system 100 to be conveniently and effortlessly transported from one aircraft to another. Housing the system 100 within such a portable enclosure 202 may have several advantages. For example, as people of skill in the art appreciate, empty space in aircrafts is limited, and placing larger testing equipment therein often necessitates that aircraft seats be taken out, which is a cumbersome and time consuming process. However, because of the compact size of the enclosure 202, the system 100 may be readily placed at several different locations within an aircraft. Further, larger testing equipment, because of its size and weight, may damage the interior (e.g., tear the carpeting, scratch the seats, et cetera) of the aircraft. The portable enclosure 202, conversely, ensures that no damage occurs to the aircraft's interior.

As can be seen in FIG. 3, the system 100 may comprise an indicator light 140, such as an LED, which may serve to apprise the user that the system 100 is currently powered on and operating. Of course, instead of or in addition to the indicator light 140, the output devices 110 may include a display (not specifically shown) that apprise the user that a test is in progress and outline for the user instructions that the user may follow to test for the susceptibility of the various aircraft systems to radio frequencies.

Figure 4:
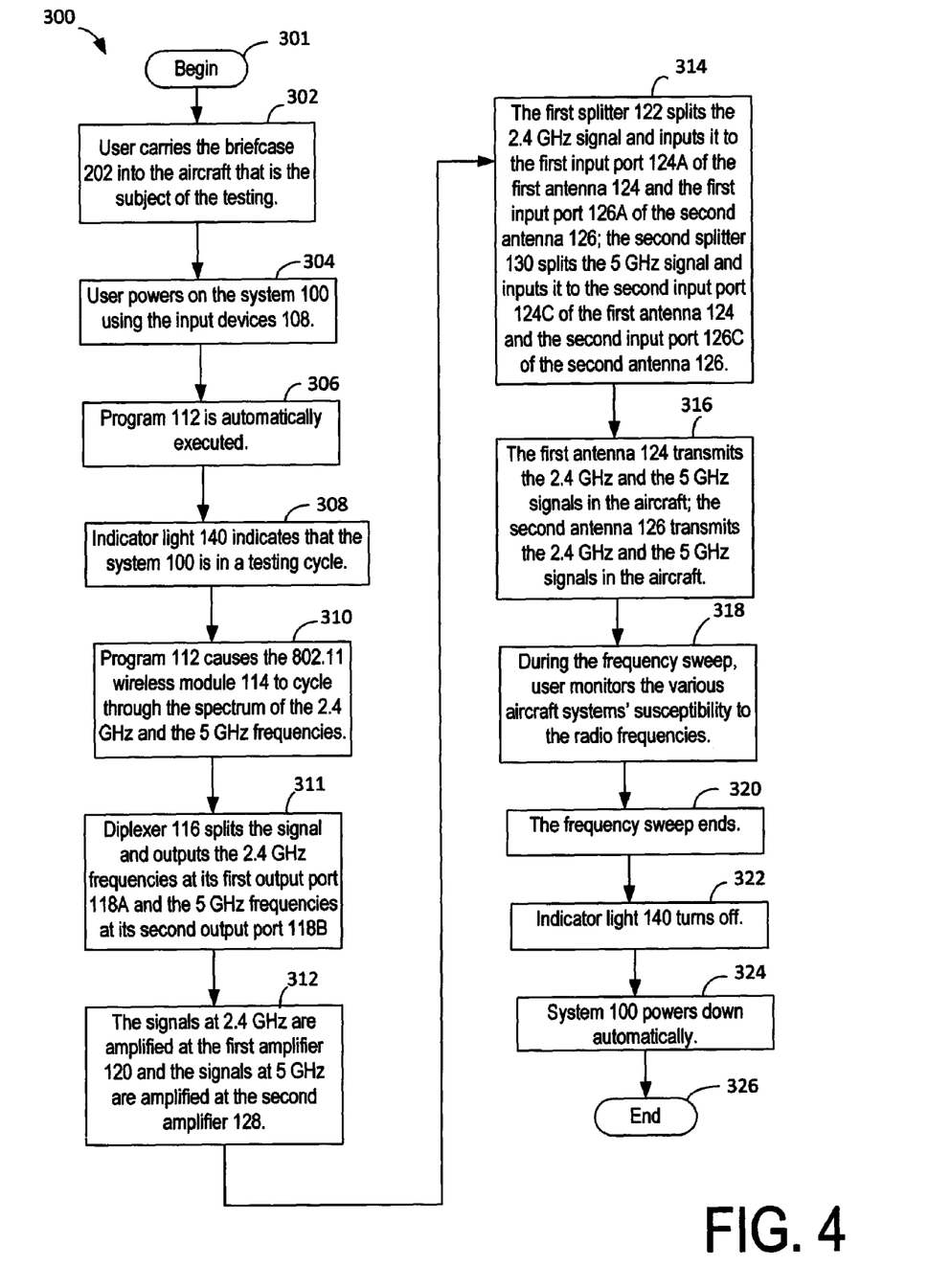
FIG. 4 is a flowchart illustrating a method of using the system of FIG. 1 to test for the susceptibility of aircraft components to radio frequencies.

Attention is directed now to FIG. 4, which shows a method 300 for using the system 100 to test the susceptibility of various aircraft systems (such as the navigation system, communication systems, autopilot systems, gyroscopes, et cetera) to radio frequencies in the chief 802.11 protocols. The method 300 may begin at step 301, and at step 302, a user may conveniently carry the briefcase 202 housing the system 100 into an aircraft whose systems are being tested for RF susceptibility. At step 304, the user may use the input devices 108 (e.g., a power button, not specifically shown) to power the system 100. Upon being powered, at step 306, the program 112 may automatically execute and cause, at step 308, to light up the indicator light 140. Lighting of the indicator light 140 may indicate to the user that a testing cycle has begun. In some embodiments, the indicator light 140 may, for example, change colors (e.g., from red to green) to convey to the user that the system 100 is conducting the testing.

At step 310, the program 112 may cause the 802.11 wireless module 114 (FIG. 2) to transmit and cycle through (or sweep) the spectrum of the 2.4 GHz and the 5 GHz frequencies such that all the relevant underlying channels are encompassed. At step 311, the diplexer 116 may split the signals and output the 2.4 GHz frequencies at its first output port 118A and output the 5 GHz frequencies at its second output port 118B. At step 312, the signals at 2.4 GHz outputted at the first output port 118A of the diplexer 116 may be amplified by the first amplifier 120; similarly, the signals at 5 GHz outputted at the second output port 118B of the diplexer 116 may be amplified at the second amplifier 128.

At step 314, the 2.4 GHz signals as amplified by the first amplifier 120 may be fed to the first splitter 122, and the first splitter 122 may split these signals at its first and second output ports 122A, 122B, respectively. The signals at the first output port 122A of the first splitter 122 may be fed as an input to the first input port 124A of the first antenna 124, and the signals at the second output port 122B of the first splitter 122 may be fed as an input to the first input 126A of the second antenna 126.

Similarly, the 5 GHz signals as amplified by the second amplifier 128 may be fed to the second splitter 130, and the second splitter 130 may split these signals at its first and second output ports 130A, 130B, respectively. The signals at the first output port 130A of the second splitter 130 may be fed as an input to the second input port 124C of the first antenna 124, and the signals at the second output port 130B of the second splitter 130 may be fed as an input to the second input port 126C of the second antenna 126.

At step 316, the first dual-band antenna 124 may transmit the 2.4 GHz and the 5 GHz signals within the aircraft, and the second dual-band antenna 126 may similarly transmit the 2.4 GHz and the 5 GHz signals within the aircraft.

At step 318, as the system 100 in essence emulates the presence of Wireless Internet in the 802.11 a/b/g/n protocols and effectuates the frequency sweep, the user may monitor the various aircraft systems' susceptibility to the radio frequencies. People of skill in the art will appreciate that in many cases, a simple visual inspection may reveal that aircraft systems are malfunctioning because of electromagnetic interference. For example, during the frequency sweep, the navigation systems may indicate that they are unable to locate certain GPS satellites and/or display that there is an operational electromagnetic interference failure; the VHF Omniranging and Instrument Landing Systems' Localizer and Glideslope may offset from the center and/or fluctuate; the displays associated with other aircraft systems may go blank; the ground proximity warning indicator may prematurely issue the command to pull up because of the interference, et cetera. In some embodiments, the output devices 110 of the system 100 may include a display screen (not specifically shown) that displays step-by-step instructions for the user to test the susceptibility of the various aircraft systems to radio frequencies for the duration of the test. It will be evident to those skilled in the art that the aircraft being tested may be stationary, but that the testing may also be conducted in-flight.

It may initially appear that completing the sweep of the frequencies in as short a time as possible would be the most efficient route. However, some system faults may occur within seconds after the sweep begins, whereas other faults may take minutes to manifest. As such, it may be desirable for the system 100 to sweep the frequencies within a reasonable amount of time (e.g., greater than a minute, and less than two hours). In the preferred embodiment, the system 100 may complete its frequency sweep in about fifteen minutes or so.

At step 320, the frequency sweep may end, and the indicator light 140 may turn off (or change colors) to indicate that the test cycle has ended. While not required, in some embodiments, the system 100 may power down automatically at step 324 (e.g., ten minutes or so after the completion of the test cycle, unless a new test cycle is initiated by the user). The method 300 may then end at step 326.

Thus, as has been described, the system 100 may emulate WiFi signals and allow the susceptibility of aircraft systems to the frequency bands employed by the 802.11 a/b/g/n protocols to be conveniently and quickly tested. Of course, once an aircraft clears the tests conducted via the system 100, wireless Internet at any of the 802.11 a, 802.11 b, 802.11 g, and 802.11 n protocols may be made available to the passengers and crew members in-flight without risk of undesirable electromagnetic interference. Further, the system 100 may allow for the entire aircraft to be tested for its RF susceptibility at once, and as such, testing using the system 100 may be preferable to the prior art methods where each aircraft system is removed and independently tested and qualified in an anechoic chamber or reverberation chamber.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An apparatus for testing for the susceptibility of an aircraft system to radio frequencies, comprising:
   a wireless module; the wireless module generating each of a first radio signal and a second radio signal; the first radio signal being in a first frequency band; the second radio signal being in a second frequency band;
   a first amplifier configured for amplifying signals in the first frequency band;
   a second amplifier configured for amplifying signals in the second frequency band;
   a diplexer operably coupled to the wireless module; the diplexer routing the first radio signal to the first amplifier and the second radio signal to the second amplifier;
   a first splitter and a second splitter; the first splitter being coupled to the first amplifier; the second splitter being coupled to the second amplifier; and
   a first dual band antenna and a second dual band antenna; each of the first dual band antenna and the second dual band antenna being coupled to each of the first splitter and the second splitter; each of the first and the second dual band antennas transmitting each of the first radio signal and the second radio signal within the aircraft;
   wherein each of the wireless module, the diplexer, the first amplifier, and the second amplifier are housed in a portable arrangement.

2. The apparatus of claim 1, wherein the first frequency band is 2.4 GHz.

3. The apparatus of claim 2, wherein the second frequency band is 5 GHz.

4. The apparatus of claim 3, wherein the portable arrangement comprises a case.

5. The apparatus of claim 4, wherein:
the case is a briefcase; and
each of the first dual band antenna and the second dual band antenna are housed in the briefcase.

6. The apparatus of claim 1, wherein:
the wireless module generates a third signal in the first frequency band and a fourth signal in the second frequency band;
the first signal and the third signal are in disparate channels; and
the second signal and the fourth signal are in disparate channels.

7. A method for testing for the susceptibility of an aircraft system to radio frequencies, comprising:
using software instructions to cause a wireless module to generate a first signal and a second signal while the aircraft is in flight; the first signal being in a first frequency band; the second signal being in a second frequency band;
using a first amplifier to amplify the first radio signal;
using a second amplifier to amplify the second radio signal;
using a first dual band antenna and a second dual band antenna to transmit each of the first signal and the second signal within the aircraft; and
examining the aircraft system to determine the susceptibility thereof to the first radio signal and the second radio signal;
wherein each of the wireless module, the first amplifier, and the second amplifier are housed in a portable arrangement.

8. The method of claim 7, wherein the first frequency band is 2.4 GHz.

9. The method of claim 7, wherein the first frequency band is 5 GHz.

10. The method of claim 7, wherein:
the first frequency band is 2.4 GHz;
the second frequency band is 5 GHz;
and
the portable arrangement comprises a briefcase.

11. The method of claim 10, wherein the wireless module sweeps through the first frequency band and the second frequency band within fifteen minutes.

12. The method of claim 11, further comprising the step of operably coupling a splitter to the first amplifier.

13. The method of claim 7, further comprising the step of providing a display screen to display a set of instructions to assist a user in testing the susceptibility of the aircraft system to the first radio signal and the second radio signal.

14. The method of claim 13, wherein:
the aircraft system is a navigation system; and
examination of the navigation system includes inspecting the navigation system to determine whether the navigation system has located a satellite.

15. A method for testing for the susceptibility of an aircraft system to radio frequencies, comprising:
using software instructions to cause a wireless module to generate a first signal and a second signal; the first signal being in a first frequency band; the second signal being in a second frequency band;
using a first amplifier to amplify the first radio signal;
using a second amplifier to amplify the second radio signal;
operably coupling the first amplifier to a first splitter and the second amplifier to a second splitter;
using a first dual band antenna and a second dual band antenna to transmit each of the first signal and the second signal within the aircraft; and
examining the aircraft system to determine the susceptibility thereof to the first radio signal and the second radio signal;
wherein each of the first dual band antenna and the second dual band antenna is operably coupled to each of the first splitter and the second splitter.

* * * * *